US012773055B2

(12) United States Patent
González et al.

(10) Patent No.: US 12,773,055 B2
(45) Date of Patent: Oct. 27, 2026

(54) MOVEABLE RACK ASSEMBLY FOR A SPARE WHEEL ASSEMBLY OF A MOTOR VEHICLE

(71) Applicant: Ford Global Technologies, LLC, Dearborn, MI (US)

(72) Inventors: Yara González, Mexico City (MX); David Camargo, Coacalco (MX); Karla Decena, Ixtapaluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 18/607,875

(22) Filed: Mar. 18, 2024

(65) Prior Publication Data

US 2025/0288132 A1 Sep. 18, 2025

(51) Int. Cl.
*A47F 7/04* (2006.01)
*B60R 9/00* (2006.01)
*B62D 43/04* (2006.01)

(52) U.S. Cl.
CPC .................. *A47F 7/04* (2013.01); *B60R 9/00* (2013.01); *B62D 43/04* (2013.01)

(58) Field of Classification Search
CPC ..... B62D 43/04; B62D 43/045; B62D 43/002
See application file for complete search history.

(56) References Cited

U.S. PATENT DOCUMENTS 1,964,119 A 6/1934 Hendry
4,401,405 A 8/1983 Ealet
4,597,711 A * 7/1986 Liebermann .......... B60B 29/002 414/427
4,690,605 A 9/1987 Coccaro
5,860,786 A * 1/1999 Aubrecht ............. B62D 43/002 414/463
9,566,826 B2 2/2017 Yaschur
10,933,692 B1 * 3/2021 Smith ................... B60B 29/002
2004/0061100 A1 4/2004 Keaton et al.
2005/0200091 A1 9/2005 Mitchell et al.
2006/0181057 A1 * 8/2006 Kollarits ................. B62B 3/104 280/475
2010/0092270 A1 4/2010 Adams
2010/0119342 A1 * 5/2010 Russ .................... B62D 43/045 414/463
2015/0284040 A1 * 10/2015 Dombrowsky ........... B62B 3/02 224/42.23
2020/0189316 A1 * 6/2020 Sauer ...................... B62B 3/104

FOREIGN PATENT DOCUMENTS

| | | |
|---|---|---|
| AU | 2012101856 A4 | 1/2013 |
| CN | 204801912 U | 11/2015 |
| CN | 210942013 U | 7/2020 |
| KR | 20080023040 A | 3/2008 |

* cited by examiner

*Primary Examiner* — Kaitlin S Joerger

(74) *Attorney, Agent, or Firm* — Vichit Chea; Carlson, Gaskey & Olds, P.C.

(57) ABSTRACT

A moveable rack assembly may include a frame including a first side and a second side opposite the first side, a first mounting assembly configured to support a first wheel assembly on the first side of the frame, and may further include a second mounting assembly configured to support a second wheel assembly on the second side of the frame.

20 Claims, 9 Drawing Sheets

MOVEABLE RACK ASSEMBLY FOR A SPARE WHEEL ASSEMBLY OF A MOTOR VEHICLE

TECHNICAL FIELD

This disclosure relates to a moveable rack assembly for a spare wheel assembly of a motor vehicle. The moveable rack assembly is configured to facilitate storage of the spare wheel assembly and to facilitate a wheel assembly changing process.

BACKGROUND

Wheel assemblies for motor vehicles include wheels and tires. Motor vehicles are known to include spare wheel assemblies. Spare wheel assemblies are often referred to colloquially as spare tires. Spare wheel assemblies are known to be carried within an interior of a motor vehicle, such as being stored in a trunk or cargo area of the motor vehicle. Spare wheel assemblies may alternatively or additionally be mounted to an exterior of the motor vehicle, such as being supported relative to a side, rear, or bottom of the motor vehicle.

SUMMARY

In some aspects, the techniques described herein relate to a moveable rack assembly, including: a frame including a first side and a second side opposite the first side; a first mounting assembly configured to support a first wheel assembly on the first side of the frame; and a second mounting assembly configured to support a second wheel assembly on the second side of the frame.

In some aspects, the techniques described herein relate to a moveable rack assembly, wherein the frame is attachable to an underbody of a motor vehicle while a wheel assembly is supported by the first mounting assembly or second mounting assembly.

In some aspects, the techniques described herein relate to a moveable rack assembly, wherein a plurality of wheels are mounted to the frame.

In some aspects, the techniques described herein relate to a moveable rack assembly, wherein four wheels are mounted to the frame.

In some aspects, the techniques described herein relate to a moveable rack assembly, wherein the frame includes a first portion and a second portion selectively movable relative to the first portion.

In some aspects, the techniques described herein relate to a moveable rack assembly, wherein the first mounting assembly and the second mounting assembly are mounted to the second portion.

In some aspects, the techniques described herein relate to a moveable rack assembly, wherein the first portion is configured to contact a ground surface.

In some aspects, the techniques described herein relate to a moveable rack assembly, wherein: the first portion includes first and second feet configured to fold between a stowed position and a deployed position, and when the first and second feet are in the deployed position, the first and second feet are configured to contact a ground surface and support the frame relative to the ground surface.

In some aspects, the techniques described herein relate to a moveable rack assembly, wherein: the first portion includes first and second channels, the second portion includes first and second arms arranged in respective first and second channels, and the first and second arms are configured to move within the first and second channels to vary a height of the first and second mounting assemblies relative to the ground surface.

In some aspects, the techniques described herein relate to a moveable rack assembly, wherein: the frame includes an opening configured to attach to a cable, the cable is coupled to a reel mounted on a motor vehicle, the reel is configured to rotate to selectively raise and lower the moveable rack assembly relative to an underbody of the motor vehicle, and a length of the cable is greater than a distance between the underbody of the motor vehicle and a ground surface.

In some aspects, the techniques described herein relate to a moveable rack assembly, wherein the length of the cable is such that the cable can be attached and detached from the opening when the frame is positioned on adjacent the ground surface and rearward of the motor vehicle.

In some aspects, the techniques described herein relate to a method, including: removing a spare wheel assembly from a motor vehicle by removing a moveable rack assembly from the motor vehicle, wherein the moveable rack assembly includes a first mounting assembly on a first side of a frame of the moveable rack assembly, and a second mounting assembly on a second side of the frame opposite the first side, wherein the second mounting assembly supports the spare wheel assembly.

In some aspects, the techniques described herein relate to a method, further including: detaching a cable from an opening of the frame.

In some aspects, the techniques described herein relate to a method, wherein a length of the cable is such that the cable can be detached from the opening when the frame is positioned adjacent a ground surface and rearward of the motor vehicle.

In some aspects, the techniques described herein relate to a method, further including: before the detaching step, sliding the moveable rack assembly along a ground surface.

In some aspects, the techniques described herein relate to a method, further including: positioning the moveable rack assembly adjacent a first wheel assembly of the motor vehicle that is to be removed from the motor vehicle; standing the moveable rack assembly upright and supporting the moveable rack assembly relative to a ground surface via support feet of the moveable rack assembly; and raising a portion of the moveable rack assembly relative to the support feet and the ground surface such that the first mounting assembly is adjacent the first wheel assembly.

In some aspects, the techniques described herein relate to a method, further including: detaching the first wheel assembly from the motor vehicle; and mounting the first wheel assembly to the first mounting assembly such that the first mounting assembly supports the first wheel assembly on the first side of the frame.

In some aspects, the techniques described herein relate to a method, further including: rotating the moveable rack assembly such that the second side of the frame faces the motor vehicle; removing the spare wheel assembly from the second mounting assembly; and attaching the spare wheel assembly to the motor vehicle.

In some aspects, the techniques described herein relate to a method, wherein supporting the moveable rack assembly relative to a ground surface via support feet includes folding first and second feet into a deployed position in which the first and second feet are configured to contact a ground surface and support the frame relative to the ground surface.

In some aspects, the techniques described herein relate to a method, wherein raising the portion of the moveable rack assembly relative to the support feet includes sliding arms of the moveable rack assembly within channels of the moveable rack assembly.

BRIEF DESCRIPTION OF THE DRAWINGS

In FIG. 3, the moveable rack assembly is in a vertical orientation.

DETAILED DESCRIPTION

This disclosure relates to a moveable rack assembly for a spare wheel assembly of a motor vehicle. The moveable rack assembly is configured to facilitate storage of the spare wheel assembly and to facilitate a wheel assembly changing process. Among other benefits, the disclosed arrangement increases the ease of the wheel assembly changing process, and in particular increases the ease of maneuvering one or more wheel assemblies.

Figure 1:
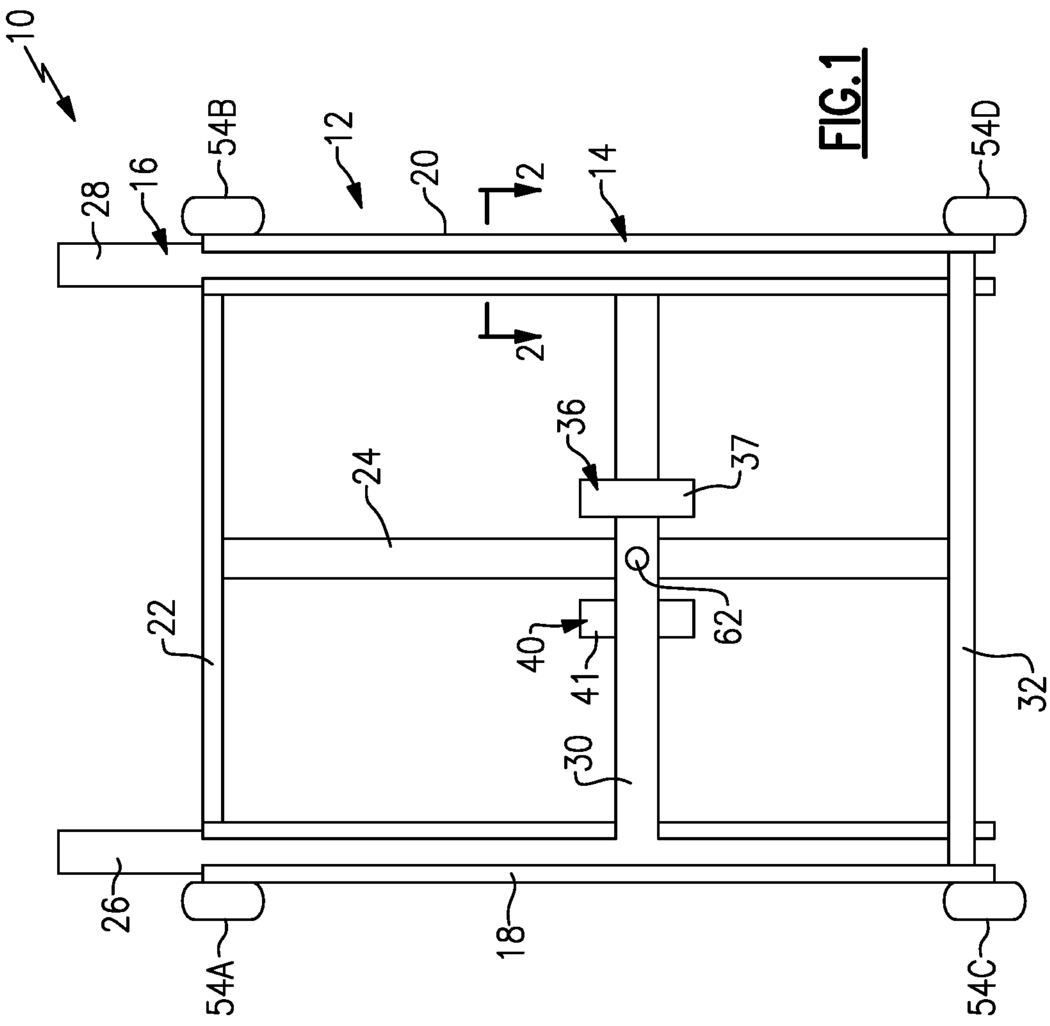
FIG. 1 is a front view of an example moveable rack assembly.

Referring to the drawings, FIG. 1 is a front view of an example moveable rack assembly 10 according to an exemplary embodiment of this disclosure. The moveable rack assembly 10 is configured to facilitate storage of a spare wheel assembly and to facilitate a wheel assembly changing process.

In this example, the moveable rack assembly 10 includes a frame 12. The frame 12 is made of a metallic material or a relatively hard plastic material, as examples. The frame 12 includes a first portion 14 and a second portion 16. The second portion 16 is selectively moveable relative to the first portion 14.

The first portion 14 includes a plurality of channels 18, 20 spaced-apart from one another by a cross-bar 22. The channels 18, 20 define opposite sides of the frame 12, in this example. The cross-bar 22 is connected at a mid-point to a central column 24, in this example. The central column 24 is not present in all examples. When present, the central column 24 may attach to another cross-bar generally opposite cross-bar 22.

Figure 2:
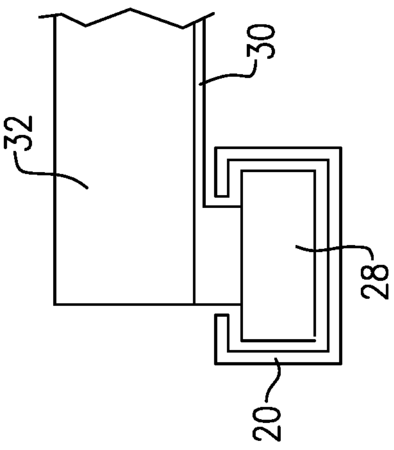
FIG. 2 is a cross-sectional view taken along line 2-2 in FIG. 1.

The second portion 16 includes a first arm 26 received in, and configured to slide in, channel 18, and a second arm 28 received in, and configured to slide in, channel 20. The first and second arms 26, 28 are spaced-apart from one another by a cross-bar 30 and a foldable base 32. The cross-bar 30 and foldable base 32 connect to the first and second arms 26, 28 so as to not interfere with the ability of the first and second arms 26, 28 to slide within the respective channels 18, 20, as generally shown in FIG. 2.

Figure 3:
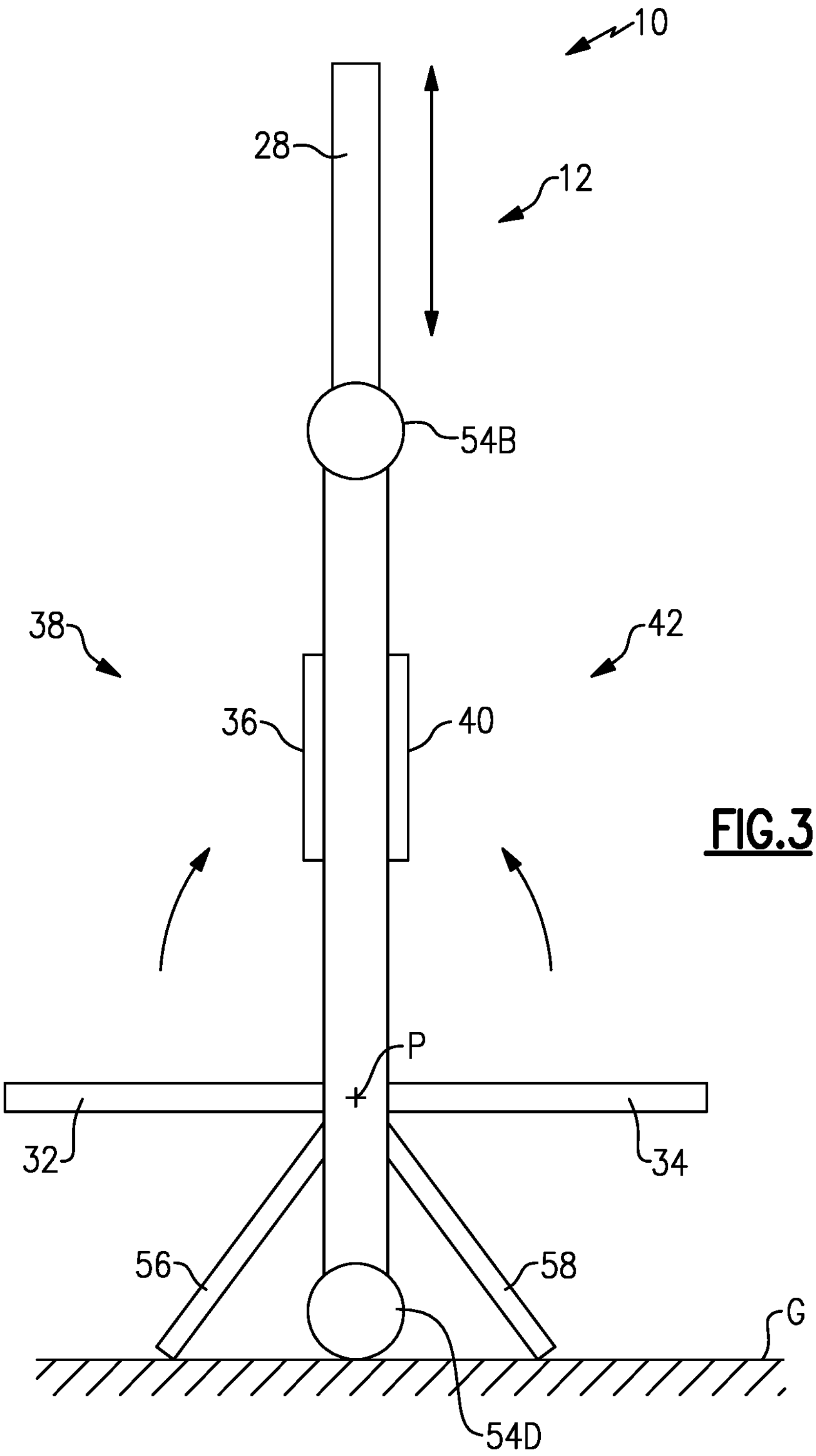
FIG. 3 is a side view of the moveable rack assembly.

While only one foldable base 32 is shown in FIG. 1, the second portion 16 includes another foldable base 34 in this example, as shown in FIG. 3. The foldable bases 32, 34 are foldable about pivot point P, for example, between a deployed position, as shown in FIG. 3, in which the foldable bases 32, 34 are substantially perpendicular to the remainder of the frame 12, and a stowed position in which the foldable bases lie in a common plane with the remainder of the frame 12. The foldable bases 32, 34 are configured to support a wheel assembly, namely a tire of a wheel assembly, from below.

With reference to FIGS. 1 and 3, the moveable rack assembly 10 includes a first mounting assembly 36 configured to support a first wheel assembly on the first side 38 of the frame 12, and further includes a second mounting assembly 40 configured to support a second wheel assembly on the second side 42 of the frame 12. In this regard, the moveable rack assembly 10 can support two wheel assemblies simultaneously.

The first mounting assembly 36 includes a bracket 37 mounted to the first side 38 of the cross-bar 30, and the second mounting assembly 40 includes a bracket 41 mounted to the second side 42 of the cross-bar 30. The first and second mounting assemblies 36, 40 need not include brackets in some examples. The first and second mounting assemblies 36, 40 may include additional structures, such as nuts and bolts or other types of fasteners, configured to selectively attach or detach a corresponding wheel assembly to the first and second mounting assemblies 36, 40. Further, the base 32 may be considered a component of the first mounting assembly 36, and the base 34 may be considered a component of the second mounting assembly 40.

Figure 4:
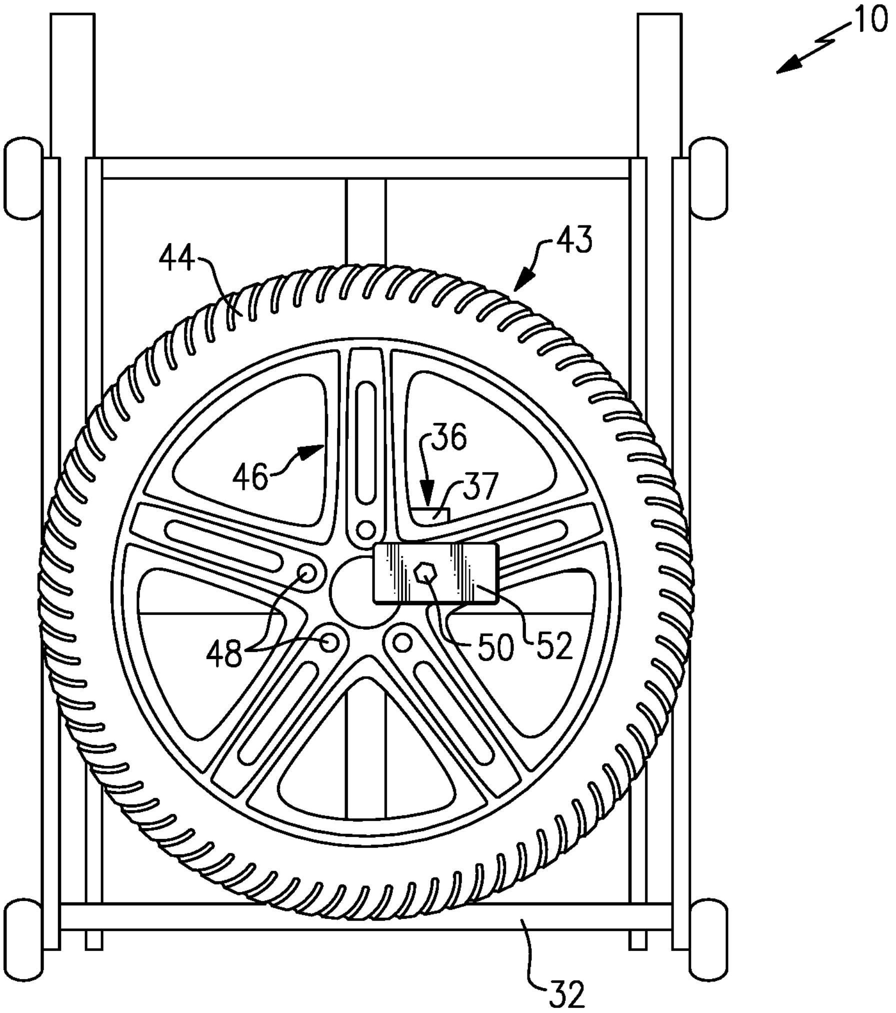
FIG. 4 is a front view of the moveable rack assembly supporting an example wheel assembly.
Figure 5:
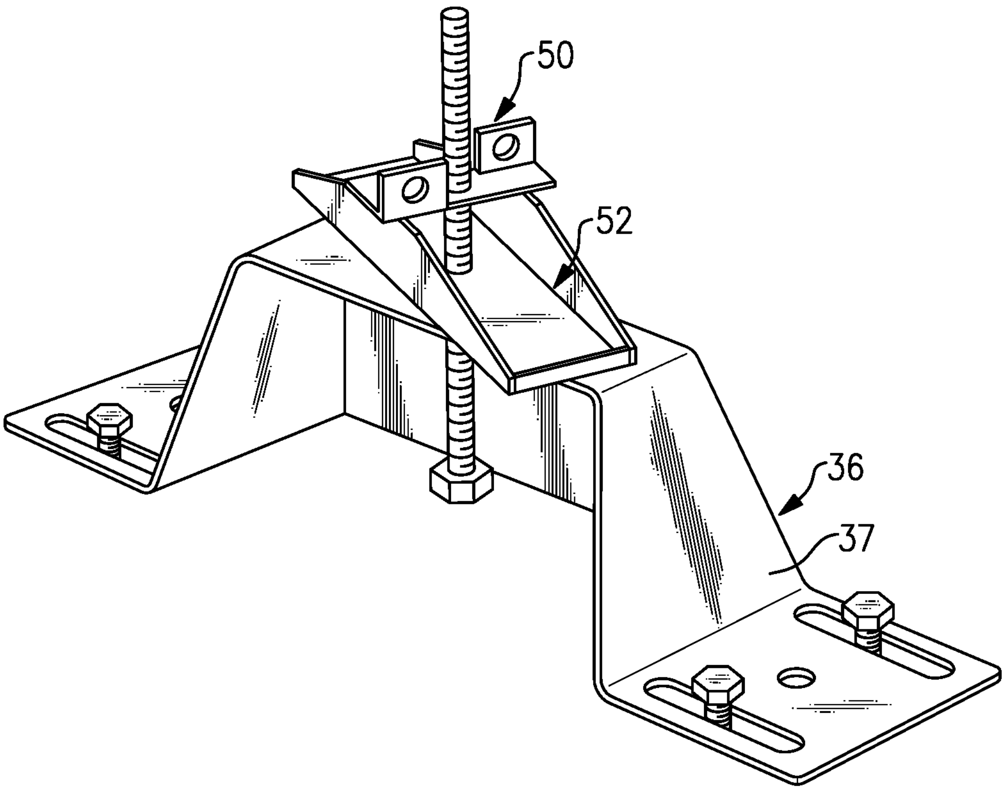
FIG. 5 is a perspective view of an example mounting assembly.

FIG. 4 illustrates an example wheel assembly 43 including a tire 44 and a hub 46 with lug holes 48. The example wheel assembly 43 is attached to the first mounting assembly 36 via a nut and bolt assembly 50 and plate 52, which are components of the first mounting assembly 36 in this example. Specifically, a bolt of the nut and bolt assembly 50 may project through one of the lug holes 48, and a nut of the nut and bolt assembly 50 may be used to apply force to the plate 52, which in turn applies force to the wheel assembly 43 to hold it against the bracket 37, thereby holding the wheel assembly 43 in place. Further, as shown, a bottom of the tire 44 is in contact with the base 32. An example arrangement of the first mounting assembly 36 including the bracket 37, nut and bolt assembly 50, and plate 52 is shown in FIG. 5. The second mounting assembly 40 can exhibit a similar arrangement and can support another wheel assembly on the opposite side of the frame 12. This disclosure is not limited to the configuration of FIG. 5.

As shown in FIG. 1, a plurality of wheels are attached to the frame 12 to facilitate movability of the frame 12 and any wheel assemblies mounted thereto. In this example, the frame 12 includes four wheels 54A-54D. The wheels 54A-54D are attached the first and second channels 18, 20 generally at corners of the first portion 14 of the frame 12. The wheels 54A-54D permit the moveable rack assembly 10 to travel in a horizontal orientation along a ground surface G, which may be concrete, grass, etc., on all four wheels 54A-54D when only one wheel assembly is mounted to the frame 12, as in FIG. 6. Further, the moveable rack assembly 10 can be moved in a vertical orientation on the bottom two wheels 54C, 54D in a similar manner to a hand truck, with top portions of the first and second arms 26, 28 functioning as handles, in one embodiment, which is generally represented in FIG. 3.

When in the vertical orientation of FIG. 3, the moveable rack assembly 10 is stabilized by feet in one example. In this example, the first portion 14 includes a portion that is configured to contact a ground surface G. In this example, the first portion 14 includes first and second feet 56, 58 configured to fold outward, away from the remainder frame 12 in opposite directions, between a stowed position and a deployed position. FIG. 3 illustrates the first and second feet 56, 58 in the deployed position in which the first and second feet 56, 58 contact the ground surface G. In a stowed position, the first and second feet 56, 58 lie substantially in a common plane with the remainder of the frame 12.

When the first and second feet 56, 58 are in the deployed position, a user can slide the second portion 16 relative to the first portion 14 by pulling the arms 26, 28 upward, causing them to slide within channels 18, 20, to raise the bases 32 and base 34, and in turn raise corresponding wheel assembly/assemblies to a desired height above the ground surface G. When a desired height is reached, the second portion 16 may be held in place relative to the first portion 14 using a known mechanism, such as a mechanism including a spring-loaded pin, a cotter pin arrangement, or the like.

Figure 6:
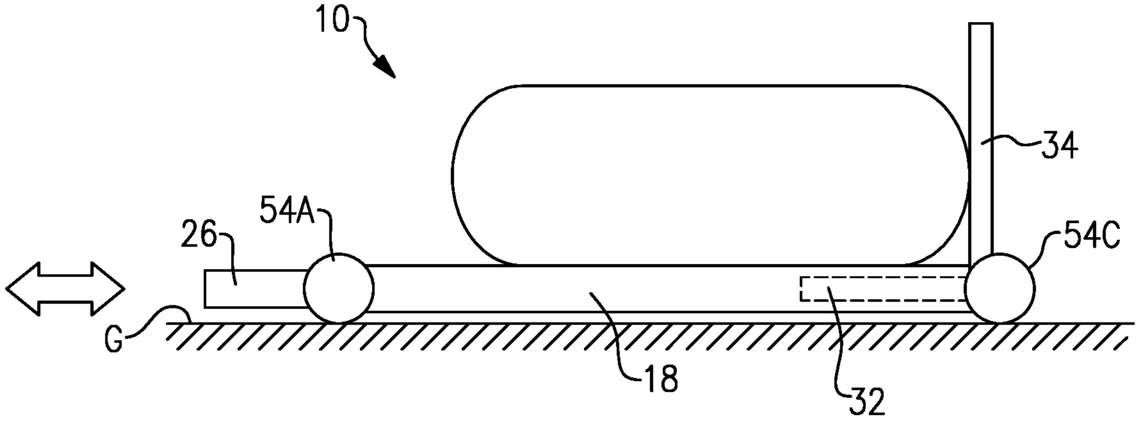
FIG. 6 is a side view of the moveable rack assembly in a horizontal orientation.
Figure 7:
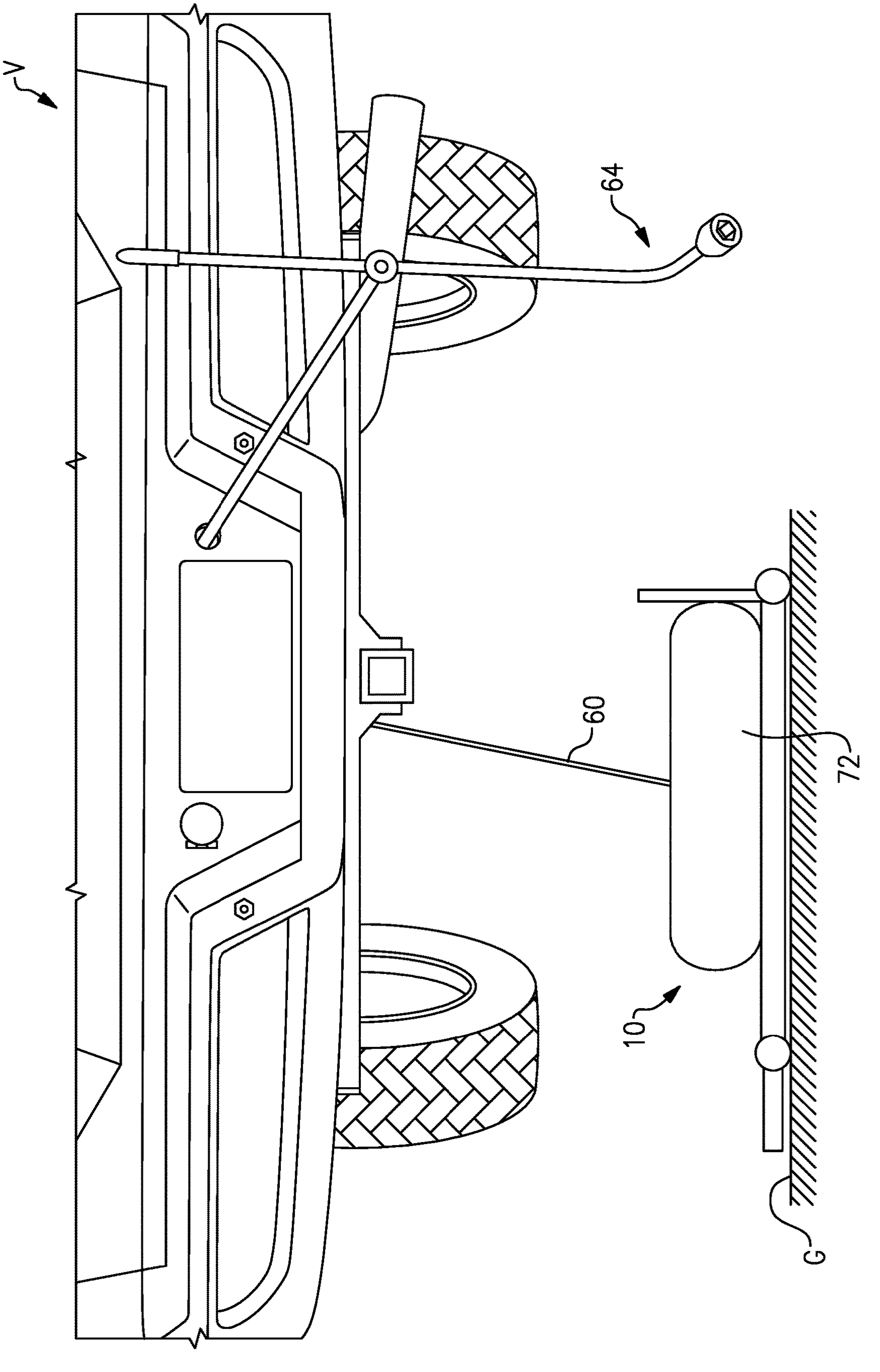
FIG. 7 illustrates the moveable rack assembly adjacent a motor vehicle, and specifically on a ground surface and generally rearward of the vehicle.

The moveable rack assembly 10 is configured to be stowed relative to an underbody of a vehicle, with at least one and in some embodiments only one, wheel assembly attached thereto. FIG. 7 illustrates the moveable rack assembly 10 in the horizontal orientation of FIG. 6 adjacent an example motor vehicle V, which in this example is a pickup truck. While a pickup truck is shown, this disclosure extends to other vehicle types.

In this example, the vehicle V includes a cable 60 and a reel mechanism (not shown). A length of the cable 60 is greater than a distance between the underbody 66 of the vehicle V and a ground surface G. Specifically, the length of the cable 60 is such that the cable 60 can be attached and detached from the opening 62 when the frame 12 is positioned adjacent the ground surface G and rearward of the vehicle V.

Figure 8:
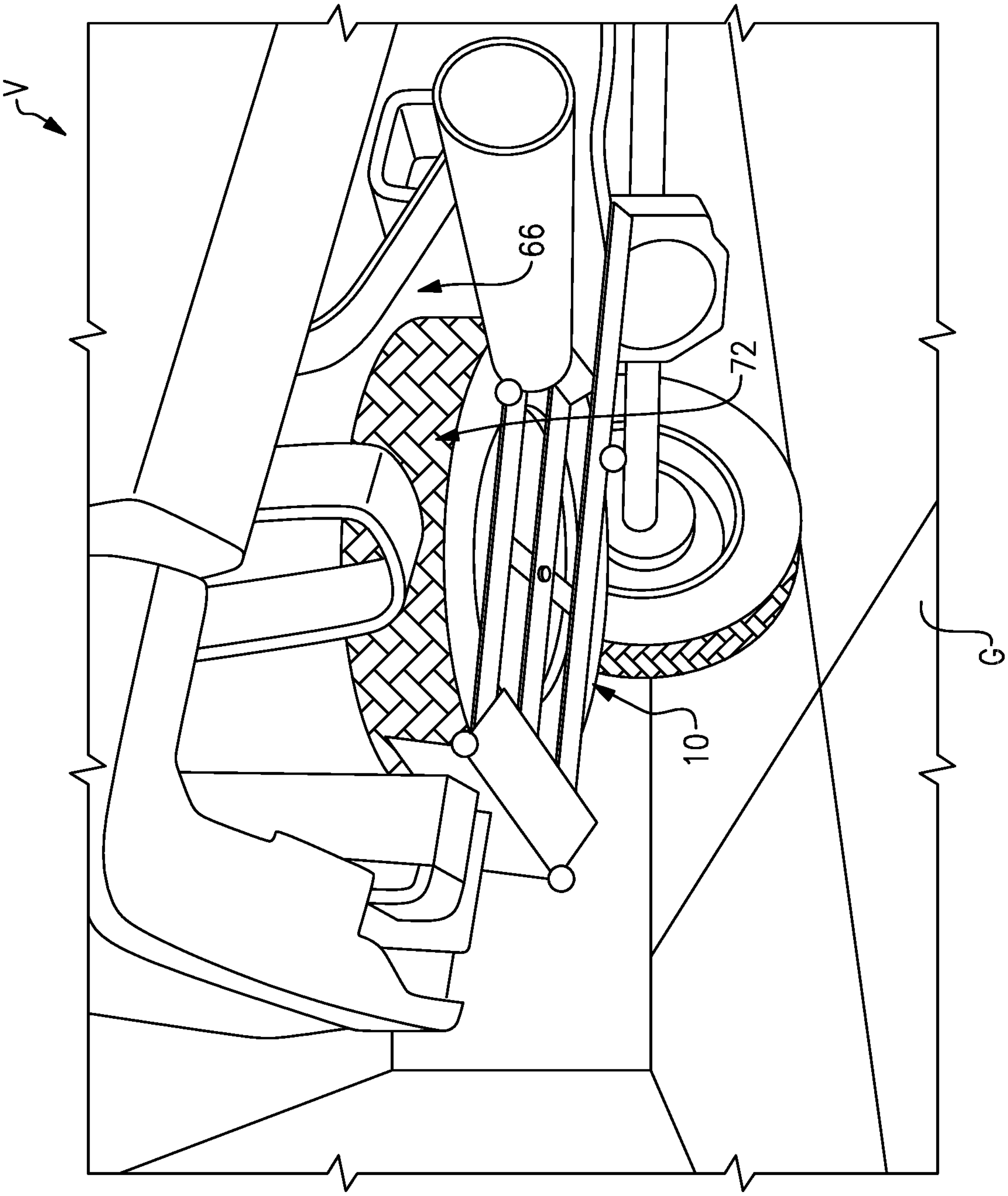
FIG. 8 illustrates the moveable rack assembly stored adjacent an underbody of the motor vehicle.

The cable 60 is attachable to the moveable rack assembly 10 via an opening 62 (FIG. 1) formed in the cross-bar 30. When the cable 60 is attached to the cross-bar 30, the reel mechanism can be cranked using crank assembly 64 to draw in the cable 60 and pull the moveable rack assembly 10, and the wheel assembly mounted thereto, into the stored position of FIG. 8. As shown in FIG. 8, the moveable rack assembly 10 is stored above the ground surface G and is adjacent an underbody 66 of the vehicle V. The process is essentially reversed to retrieve the moveable rack assembly 10, and the wheel assembly mounted thereto, from the underbody 66 of the vehicle V. This disclosure increases the ease of retrieving the wheel assembly because of the ability of the moveable rack assembly 10 to travel along the ground surface G, as generally shown in FIG. 6. While a manually-operated crank assembly 64 is shown, the reel mechanism could be rotated using a motor, for example.

In an example method of use, the moveable rack assembly 10 is in place relative to the underbody and supports a spare wheel assembly 72. When a user decides one of the wheel assemblies of the vehicle V needs to be removed and replaced, the user lowers the moveable rack assembly 10 into the position of FIG. 7 and detaches it from the cable 60.

Figure 9:
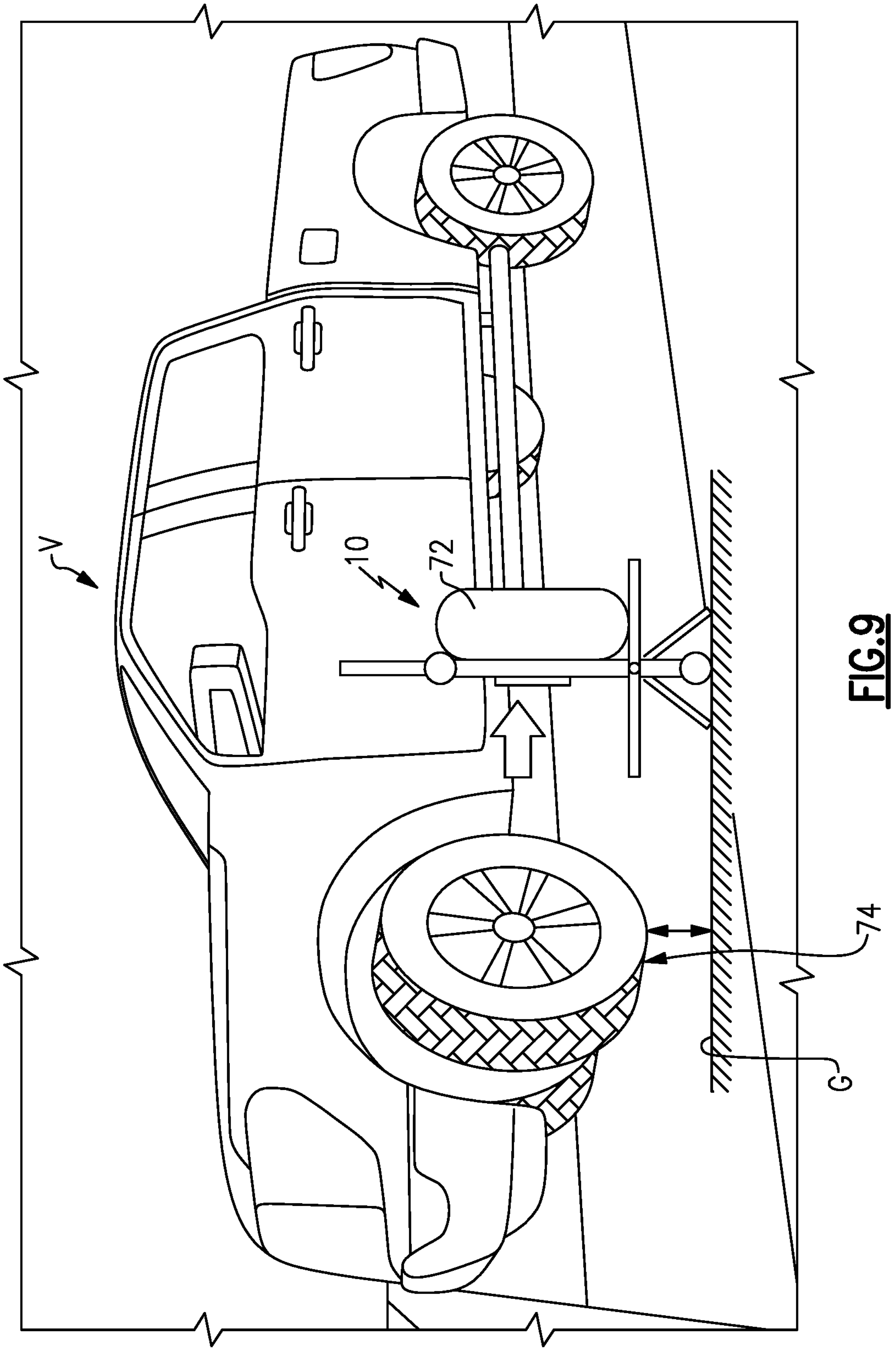
FIG. 9 illustrates the motor vehicle and the moveable rack assembly, with the moveable rack assembly supporting an example spare wheel assembly relative to a wheel assembly that is to be removed and changed.
Figure 10:
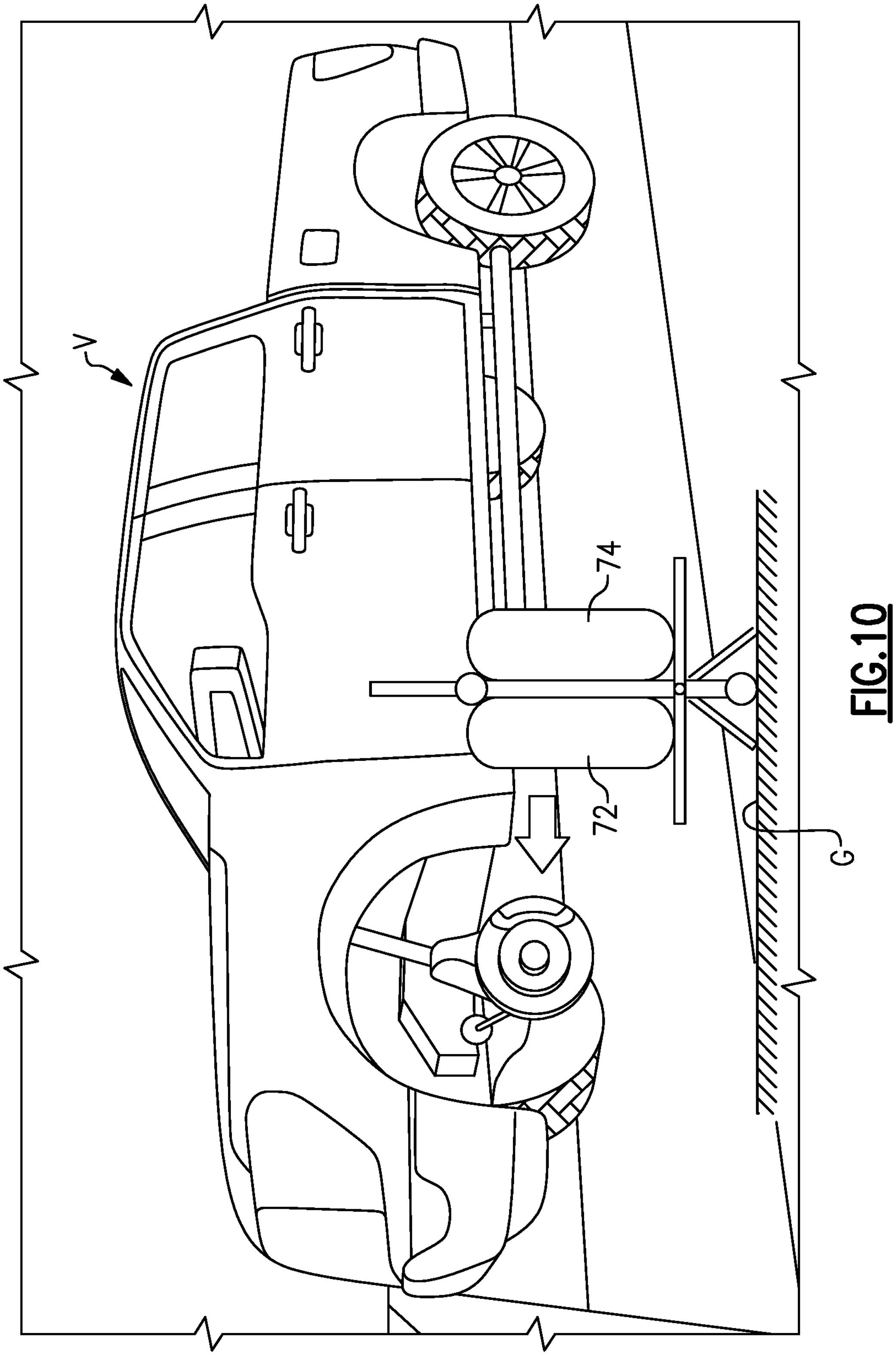
FIG. 10 illustrates the motor vehicle and the moveable rack assembly, with the moveable rack assembly supporting both the wheel assembly that was removed and the spare wheel assembly.

The user can then orient the moveable rack assembly 10 into a generally vertical orientation, as generally shown in FIG. 2, and push or pull the moveable rack assembly 10 and spare wheel assembly 72 to a position adjacent the wheel assembly 74 that is going to be removed and replaced, as shown in FIG. 9. In FIG. 9, wheel assembly 74 is raised above ground surface G. A user can deploy first and second feet 56, 58 to support the moveable rack assembly 10 and raise the second portion 16 into a position where the first mounting assembly 36 substantially aligns vertically with the wheel assembly 74. When the wheel assembly 74 is loosened from its vehicle attachment point, which may be an axle, the user can readily transfer the wheel assembly 74 to the first mounting assembly 36. With the wheel assembly 74 removed from the vehicle V and attached to the first mounting assembly 36, the user can rotate the moveable rack assembly 10 such that the spare wheel assembly 72 faces the vehicle attachment point, as shown in FIG. 10. In this position, the user can readily transfer the spare wheel assembly 72 to the wheel attachment point and complete the spare wheel assembly changing process. The moveable rack assembly 10 can then be re-attached to the underbody 66 along with the wheel assembly 74 using the above-discussed process.

It should be understood that directional terms such as “bottom,” “top,” “forward,” “rearward,” “upward,” “downward,” etc., are used for purposes of explanation only and should not be deemed limiting. Further, it should be understood that terms such as “about,” “substantially,” and “generally” are not intended to be boundaryless terms, and should be interpreted consistent with the way one skilled in the art would interpret those terms. It should be understood that certain aspects of the disclosure are exaggerated in the Figures for purposes of illustration only.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A moveable rack assembly, comprising:
a frame including a first side and a second side opposite the first side;
a first mounting assembly configured to support a first wheel assembly on the first side of the frame; and
a second mounting assembly configured to support a second wheel assembly on the second side of the frame,
wherein the frame is attachable to an underbody of a motor vehicle while a wheel assembly is supported by the first mounting assembly or the second mounting assembly.

2. The moveable rack assembly as recited in claim 1, wherein a plurality of wheels are mounted to the frame.

3. The moveable rack assembly as recited in claim 2, wherein four wheels are mounted to the frame.

4. The moveable rack assembly as recited in claim 1, wherein the frame includes a first portion and a second portion selectively movable relative to the first portion.

5. The moveable rack assembly as recited in claim 4, wherein the first mounting assembly and the second mounting assembly are mounted to the second portion.

6. The moveable rack assembly as recited in claim 5, wherein the first portion is configured to contact a ground surface.

7. The moveable rack assembly as recited in claim 6, wherein:

the first portion includes first and second feet configured to fold between a stowed position and a deployed position, and when the first and second feet are in the deployed position, the first and second feet are configured to contact a ground surface and support the frame relative to the ground surface.

8. The moveable rack assembly as recited in claim 7, wherein:

the first portion includes first and second channels, the second portion includes first and second arms arranged in respective first and second channels, and the first and second arms are configured to move within the first and second channels to vary a height of the first and second mounting assemblies relative to the ground surface.

9. A moveable rack assembly, comprising:

a frame including a first side and a second side opposite the first side;

a first mounting assembly configured to support a first wheel assembly on the first side of the frame; and a second mounting assembly configured to support a second wheel assembly on the second side of the frame, wherein the frame includes an opening configured to attach to a cable, wherein the cable is coupled to a reel mounted on a motor vehicle, wherein the reel is configured to rotate to selectively raise and lower the moveable rack assembly relative to an underbody of the motor vehicle, and wherein a length of the cable is greater than a distance between the underbody of the motor vehicle and a ground surface.

10. The moveable rack assembly as recited in claim 9, wherein the length of the cable is such that the cable can be attached and detached from the opening when the frame is positioned on the ground surface and rearward of the motor vehicle.

11. A method, comprising:

removing a spare wheel assembly from a motor vehicle by removing a moveable rack assembly from the motor vehicle, wherein the moveable rack assembly includes a first mounting assembly on a first side of a frame of the moveable rack assembly and configured to support a first wheel assembly of the motor vehicle, and a second mounting assembly on a second side of the frame opposite the first side, wherein the second mounting assembly supports the spare wheel assembly.

12. The method as recited in claim 11, further comprising:

detaching a cable from an opening of the frame.

13. The method as recited in claim 12, wherein a length of the cable is such that the cable can be detached from the opening when the frame is positioned adjacent a ground surface and rearward of the motor vehicle.

14. The method as recited in claim 12, further comprising:

before the detaching, sliding the moveable rack assembly along a ground surface.

15. The method as recited in claim 11, further comprising:

positioning the moveable rack assembly adjacent the first wheel assembly of the motor vehicle that is to be removed from the motor vehicle;

standing the moveable rack assembly upright and supporting the moveable rack assembly relative to a ground surface via support feet of the moveable rack assembly; and raising a portion of the moveable rack assembly relative to the support feet and the ground surface such that the first mounting assembly is adjacent the first wheel assembly.

16. The method as recited in claim 15, further comprising:

detaching the first wheel assembly from the motor vehicle; and mounting the first wheel assembly to the first mounting assembly such that the first mounting assembly supports the first wheel assembly on the first side of the frame.

17. The method as recited in claim 16, further comprising:

rotating the moveable rack assembly such that the second side of the frame faces the motor vehicle;

removing the spare wheel assembly from the second mounting assembly; and attaching the spare wheel assembly to the motor vehicle.

18. The method as recited in claim 16, wherein supporting the moveable rack assembly relative to a ground surface via support feet includes folding first and second feet into a deployed position in which the first and second feet are configured to contact a ground surface and support the frame relative to the ground surface.

19. The method as recited in claim 16, wherein raising the portion of the moveable rack assembly relative to the support feet includes sliding arms of the moveable rack assembly within channels of the moveable rack assembly.

20. The moveable rack assembly as recited in claim 1, wherein:

the first mounting assembly is configured to support the first wheel assembly by way of a first bolt projecting through a lug hole of the first wheel assembly, and the second mounting assembly is configured to support the second wheel assembly by way of a second bolt projecting through a lug hole of the second wheel assembly.

* * * * *